United States Patent
Oishi et al.

(10) Patent No.: US 12,494,222 B2
(45) Date of Patent: Dec. 9, 2025

(54) SPONSORSHIP CREDIT PERIOD IDENTIFICATION APPARATUS, SPONSORSHIP CREDIT PERIOD IDENTIFICATION METHOD AND PROGRAM

(71) Applicant: NIPPON TELEGRAPH AND TELEPHONE CORPORATION, Tokyo (JP)

(72) Inventors: Yasunori Oishi, Tokyo (JP); Takahito Kawanishi, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 549 days.

(21) Appl. No.: 17/428,612

(22) PCT Filed: Jan. 24, 2020

(86) PCT No.: PCT/JP2020/002458
§ 371 (c)(1),
(2) Date: Aug. 4, 2021

(87) PCT Pub. No.: WO2020/162220
PCT Pub. Date: Aug. 13, 2020

(65) Prior Publication Data
US 2022/0115031 A1 Apr. 14, 2022

(30) Foreign Application Priority Data
Feb. 7, 2019 (JP) ................................ 2019-020322

(51) Int. Cl.
*G10L 25/57* (2013.01)
*G06Q 30/0242* (2023.01)
(Continued)

(52) U.S. Cl.
CPC .......... *G10L 25/57* (2013.01); *G06Q 30/0246* (2013.01); *G06V 20/46* (2022.01); *G10L 15/02* (2013.01); *G10L 15/08* (2013.01)

(58) Field of Classification Search
CPC ......... G10L 25/57; G10L 15/02; G10L 15/08; G10L 15/00; G06Q 30/0246; G06V 20/46;
(Continued)

(56) References Cited

U.S. PATENT DOCUMENTS

2003/0028873 A1* 2/2003 Lemmons ........ H04N 21/23418
348/588
2004/0062520 A1* 4/2004 Gutta ................. H04N 21/4394
386/249

(Continued)

FOREIGN PATENT DOCUMENTS

WO 2008050718 A1 5/2008

OTHER PUBLICATIONS

Japan Post Production Association (2018) "CM metadata input support tool" Dec. 27, 2018 (Reading Day) [online] website: http://www.jppanet.or.jp/documents/video.html.

Primary Examiner — Michael N Opsasnick

(57) ABSTRACT

A credit segment identifying device includes an extracting unit. The extracting units extracts, from a first speech signal, a plurality of first partial speech signals. Each of the plurality of first partial speech signals is a part of the first speech signals and shifted from each other in time direction. An identifying unit identifies a credit segment in the first speech signal by determining whether each of the first partial speech signals includes a credit according to an association between each of second partial signals and the presence/absence of a credit. The each of second partial signals is extracted from a second speech signal.

17 Claims, 14 Drawing Sheets

(51) Int. Cl.
*G06V 20/40* (2022.01)
*G10L 15/02* (2006.01)
*G10L 15/08* (2006.01)

(58) Field of Classification Search
CPC ....... G06V 10/454; G06F 16/60; G06F 16/65; H04N 17/00; H04N 21/442
See application file for complete search history.

(56) References Cited

U.S. PATENT DOCUMENTS

| | | | |
|---|---|---|---|
| 2009/0256972 A1* | 10/2009 | Ramaswamy | G06T 1/0021 348/738 |
| 2010/0306402 A1* | 12/2010 | Russell | H04L 65/1089 709/230 |
| 2011/0238495 A1* | 9/2011 | Kang | G06Q 30/0251 705/14.49 |
| 2016/0073148 A1* | 3/2016 | Winograd | H04N 21/6582 725/18 |
| 2016/0219330 A1* | 7/2016 | Parker | H04N 21/44008 |
| 2017/0124048 A1* | 5/2017 | Campbell | G06F 40/18 |
| 2018/0176645 A1* | 6/2018 | Reyes Sanchez | H04H 60/66 |

* cited by examiner

SPONSORSHIP CREDIT PERIOD IDENTIFICATION APPARATUS, SPONSORSHIP CREDIT PERIOD IDENTIFICATION METHOD AND PROGRAM

CROSS-REFERENCE TO RELATED APPLICATIONS

This application is a U.S. 371 Application of International Patent Application No. PCT/JP2020/002458, filed on 24 Jan. 2020, which application claims priority to and the benefit of JP Application No. 2019-020322, filed on 7 Feb. 2019, the disclosures of which are hereby incorporated herein by reference in their entireties.

TECHNICAL FIELD

The present invention relates to a credit segment identifying device, a credit segment identifying method, and a program therefor.

BACKGROUND ART

An economic value has been recognized in investigating which company sponsors which broadcast program for example in TV broadcasts.

This kind of investigation is conducted by visually finding sponsor credits displayed for example in TV broadcasts and transcribing the names of the companies from the credits. The sponsor credit refers to a display of the sponsor's logo or narration of the sponsor of a broadcast program (e.g., "This broadcast program is brought to you by XXX and the sponsors you see").

CITATION LIST

Non Patent Literature

[NPL 1] [online], retrieved from the Internet: <URL: http://www.jppanet.or.jp/documents/video.html>

SUMMARY OF THE INVENTION

Technical Problem

However, sponsor credit segments add up to only about 1% of the entire broadcast. Therefore, a lot of time is spent on viewing for example a TV broadcast for identifying sponsor credit segments in the investigation.

Note that the case of sponsor credits has been described for the sake of illustration, while the same problem is encountered in identifying credit segments other than sponsor credit such as a particular commercial.

With the foregoing in view, it is an object of the present invention to improve efficiency in identifying credit segments.

Means for Solving the Problem

In order to solve the problem, a credit segment identifying device includes an extracting unit which extracts, from a first speech signal, a plurality of first partial speech signals which are each a part of the first speech signal and shifted from each other in time direction, and an identifying unit which identifies a credit segment in the first speech signal by determining whether each of the first partial speech signals includes a credit according to an association between each of second partial speech signals extracted from a second speech signal and the presence/absence of a credit.

Effects of the Invention

Credit segments can be efficiently identified.

DESCRIPTION OF EMBODIMENTS

Figure 1:
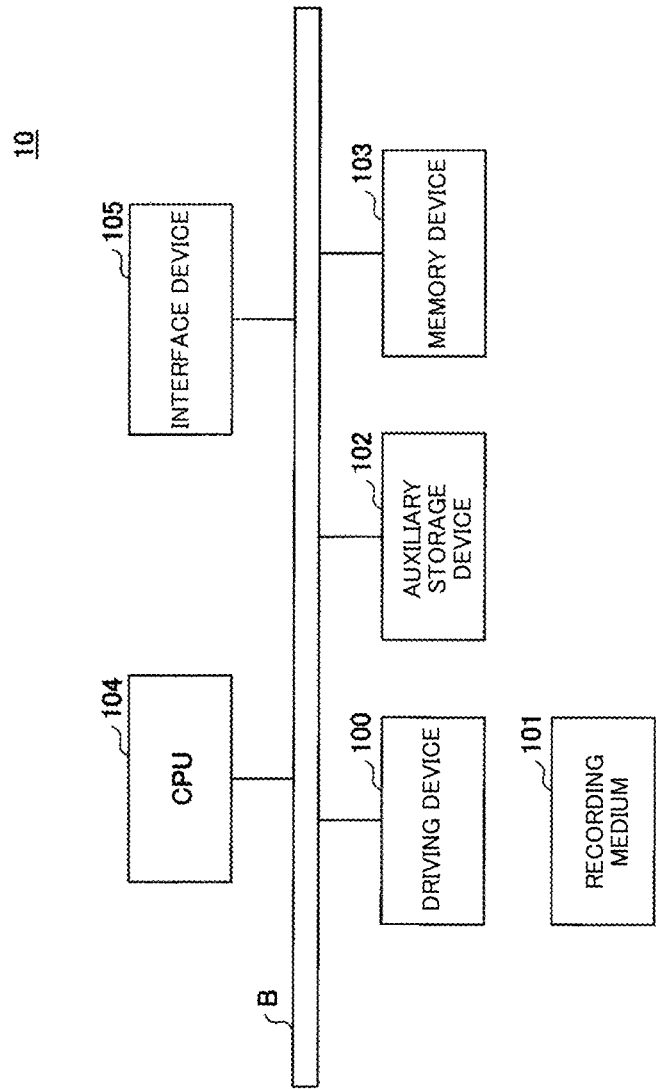
FIG. 1 is a diagram of an exemplary hardware configuration of a sponsor credit segment identifying device 10 according to a first embodiment.

Hereinafter, embodiments of the present invention will be described in conjunction with the accompanying drawings. FIG. 1 is a diagram of an exemplary hardware configuration of a sponsor credit segment identifying device 10 according to a first embodiment of the invention. The sponsor credit segment identifying device 10 in FIG. 1 may be a computer having a driving device 100, an auxiliary storage device 102, a memory device 103, a CPU 104, and an interface device 105 which are connected with one another by a bus B.

A program for implementing processing by the sponsor credit segment identifying device 10 is provided through a recording medium 101 such as a CD-ROM. When the recording medium 101 is set in the driving device 100, the program is installed in the auxiliary storage device 102 from the recording medium 101 through the driving device 100.

Note however that the program does not have to be installed from the recording medium 101 and may be downloaded from another computer through a network. The auxiliary storage device 102 stores the installed program as well as necessary files and data.

The memory device 103 reads out the program from the auxiliary storage device 102 and stores the program in response to a program activation instruction. The CPU 104 performs functions related to the sponsor credit segment identifying device 10 according to the program stored in the memory device 103. The interface device 105 is used as an interface for connecting to a network.

Figure 2:
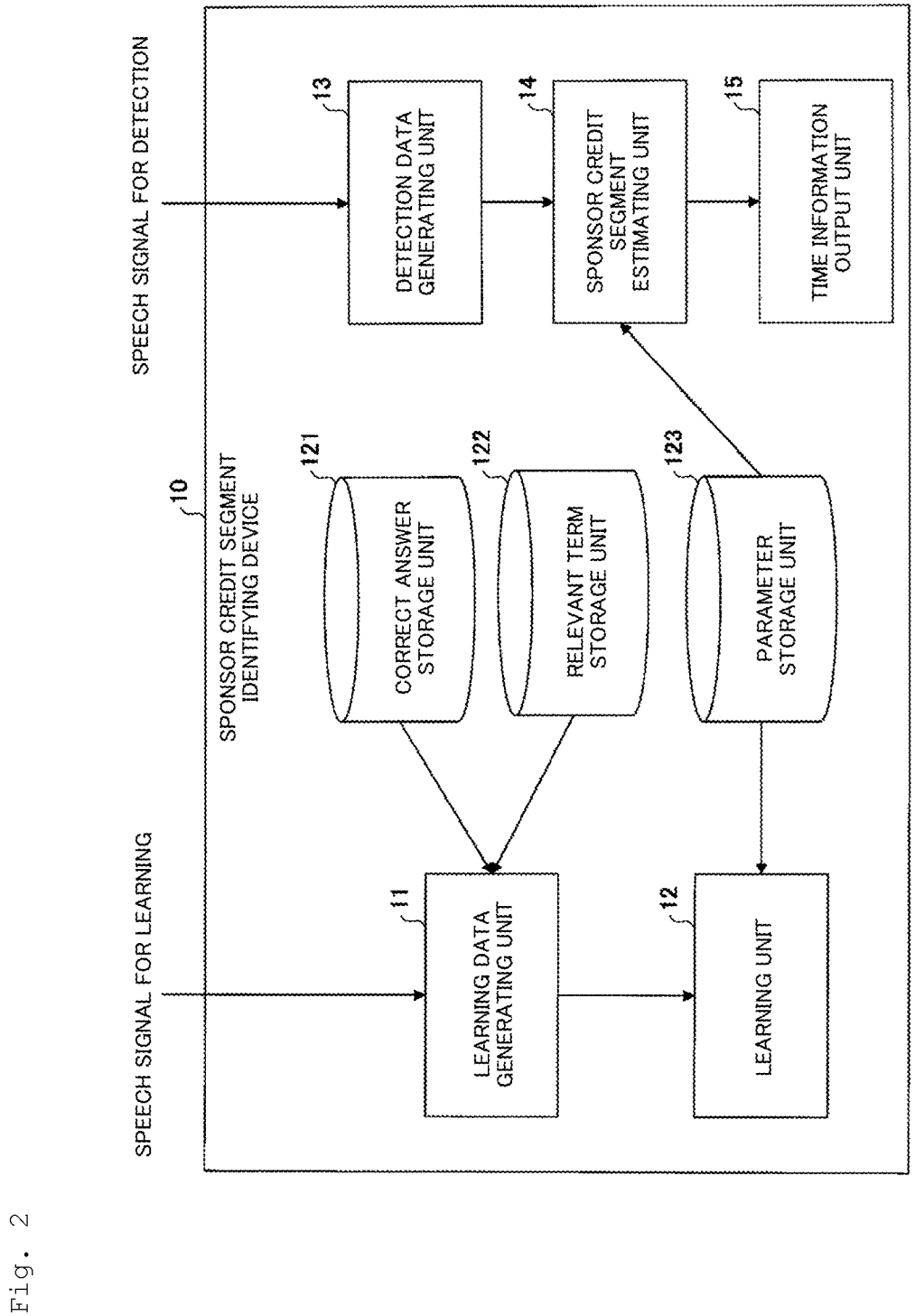
FIG. 2 is a diagram of an exemplary functional configuration of the sponsor credit segment identifying device 10 according to the first embodiment.

FIG. 2 is a diagram of an exemplary functional configuration of the sponsor credit segment identifying device 10 according to the first embodiment. In FIG. 2, the sponsor credit segment identifying device 10 includes a learning data generating unit 11, a learning unit 12, a detection data generating unit 13, a sponsor credit segment estimating unit 14, and a time information output unit 15. These units are implemented as at least one program installed in the sponsor credit segment identifying device 10 is executed by the CPU 104. The sponsor credit segment identifying device 10 also uses a correct answer storage unit 121, a relevant term storage unit 122, and a parameter storage unit 123. These storage units can be implemented for example using the auxiliary storage device 102 or a storage device which can be connected to the sponsor credit segment identifying device 10 through a network.

The correct answer storage unit 121 stores time data (starting time and ending time) indicating the segment of a sponsor credit (hereinafter referred to as a "sponsor credit segment") for a speech signal (hereinafter referred to as a "speech signal for learning") in a TV broadcast for learning aired during a certain period of time (hereinafter referred to as a "TV broadcast for learning"). The sponsor credit segment may be visually checked in advance by a user.

The relevant term storage unit 122 stores relevant terms included in an announcement (which is aired while the sponsor credit is displayed) in the sponsor credit display and related to the sponsor credit display. Examples of the relevant terms include words such as "you see", "sponsors", "by courtesy of", and "is/was brought to you". A term indicating the name of a company may be a relevant term. Note that the relevant terms are for example set by a user in advance.

The parameter storage unit 123 stores parameters for an identifier which identifies the presence/absence of a sponsor credit in a speech signal. The identifier is a model which has learned associations between a plurality of speech signals (the "speech segments" in the following) extracted from a speech signal for learning and the presence/absence of a sponsor credit.

Figure 3:
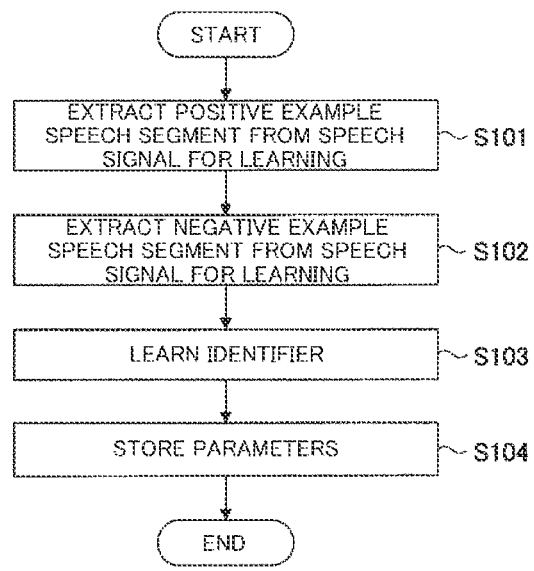
FIG. 3 is a flowchart for illustrating an example of a processing procedure for learning processing according to the first embodiment.

Hereinafter, the processing procedure performed by the sponsor credit segment identifying device 10 will be described. FIG. 3 is a flowchart for illustrating an example of the processing procedure for learning processing according to the first embodiment.

In step S101, the learning data generating unit 11 extracts a positive example speech segment (a part of a speech signal for learning presumed to include a sponsor credit (a partial speech signal)) from the speech signal for learning.

Specifically, the learning data generating unit 11 specifies a sponsor credit segment in the speech signal for learning on the basis of time data stored in the correct answer storage unit 121. Note that there may be more than one sponsor credit segments. The learning data generating unit 11 performs speech recognition on each of specified sponsor credit segments in the speech signal for learning and generates a speech recognition result (text data) for each sponsor credit segment. The learning data generating unit 11 specifies, for each text data, a part including any of the relevant terms stored in the relevant term storage unit 122, and extracts a speech signal corresponding to the part as a positive example speech segment in the speech signal for learning. For example, an N-second part each before and after a relevant term is extracted as a positive example speech segment. According to the embodiment, N=3. However, N may be any other value.

Figure 4:
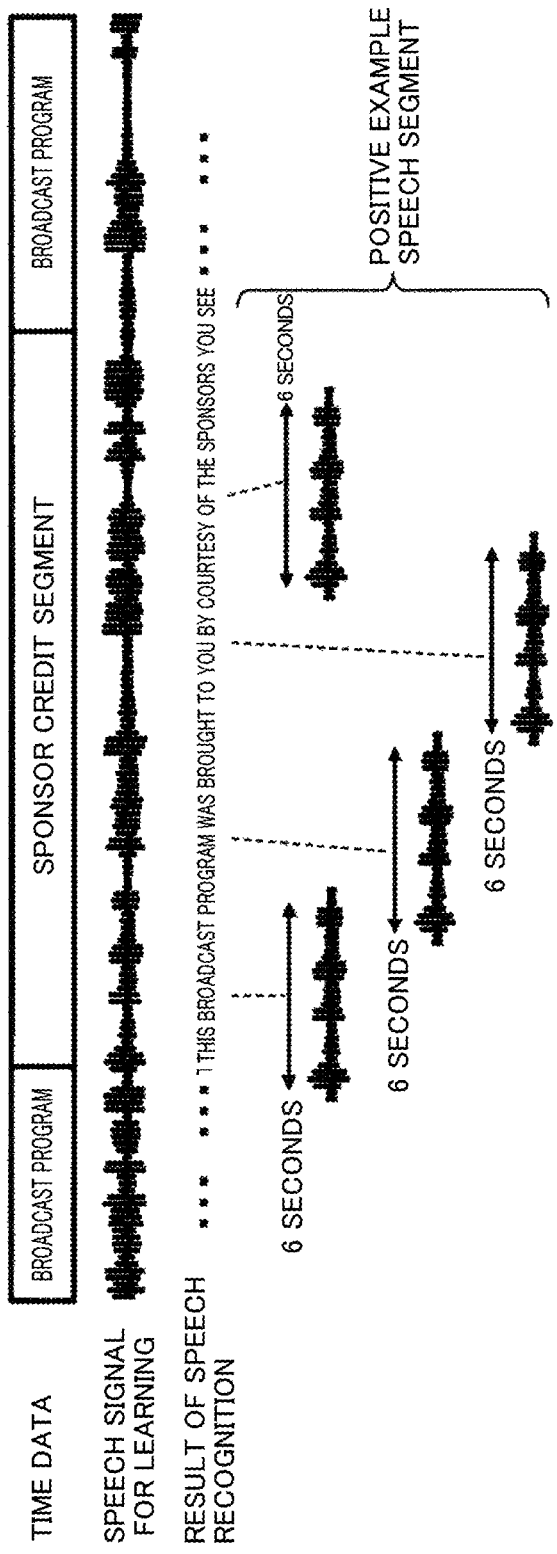
FIG. 4 is a chart for illustrating an example of how a positive example speech segment is extracted according to the first embodiment.

FIG. 4 is a chart for illustrating an example of how a positive example speech segment is extracted according to the first embodiment. In FIG. 4, the part of the speech signal for learning corresponding to "this broadcast program was brought to you by courtesy of the sponsors you see" corresponds to the sponsor credit segment, in which the terms such as "you see", "sponsors", "by courtesy of", and "brought to you" are examples of the relevant terms. Therefore, a speech signal for about three seconds each before and after any of these relevant terms is extracted as a positive example speech segment.

The learning data generating unit 11 then extracts a negative example speech segment from a random part of the speech signal for learning other than the sponsor credit segment (S102). The negative example speech segment is as long as the positive example speech segment (six seconds). The number of negative example speech segments is preferably the same as the number of the positive example speech segments.

The learning unit 12 then learns an identifier for the sponsor credit segment using the positive example speech segment extracted in step S101 and the negative example speech segment extracted in step S102 (S103).

Specifically, the learning unit 12 obtains a 600×40 mel-spectrogram by subjecting each positive or negative example speech segment to frequency analysis (for example with a window length of 25 ms and a window shift length of 10 ms) and to mel-filter bank processing with 40 filters. The learning unit 12 learns, for each speech segment, an identifier which 2-class identifies (detects) whether the speech segment has a sponsor credit (whether the speech segment includes a sponsor credit) using the mel-spectrogram obtained for each segment as an input feature quantity. More specifically, for a positive example speech segment, the presence of a sponsor credit is learned, and for a negative example speech segment, the absence of a sponsor credit is learned. The identifier may be a convolution neural network or any other identifier such as an SVM (support vector machine).

Figure 5:
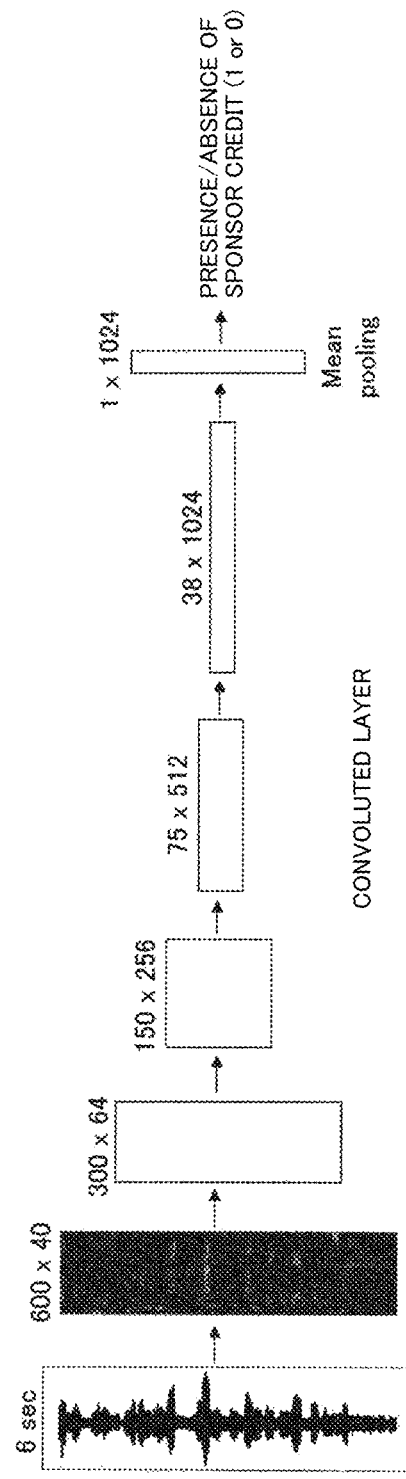
FIG. 5 is a diagram for illustrating a model example of an identifier according to the first embodiment.

FIG. 5 is a diagram for illustrating a model example of the identifier according to the first embodiment. The example illustrated in FIG. 5 uses a convolution neural network.

The learning unit 12 then stores parameters for the learned identifier in the parameter storage unit 123 (S104).

Figure 6:
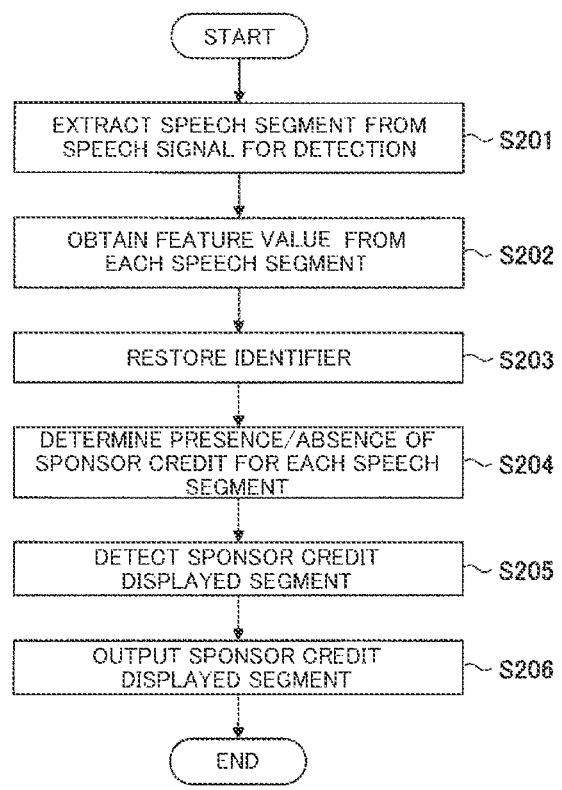
FIG. 6 is a flowchart for illustrating an example of a processing procedure for detecting a sponsor credit according to the first embodiment.

FIG. 6 is a flowchart for illustrating an example of a processing procedure for detecting a sponsor credit according to the first embodiment. In the processing procedure in FIG. 6, it is assumed that the processing procedure in FIG. 3 has already been performed.

In step S201, the detection data generating unit 13 extracts a speech segment with a window length of 2N seconds and a window shift length of one second from a speech signal (hereinafter referred to as the "speech signal for detection") in a TV broadcast for detecting a sponsor credit (hereinafter referred to as the "TV broadcast for detection"). Since N=3 according to the embodiment, multiple six-second speech segments shifted by one second (shifted in the time direction between each other) are extracted.

Figure 7:
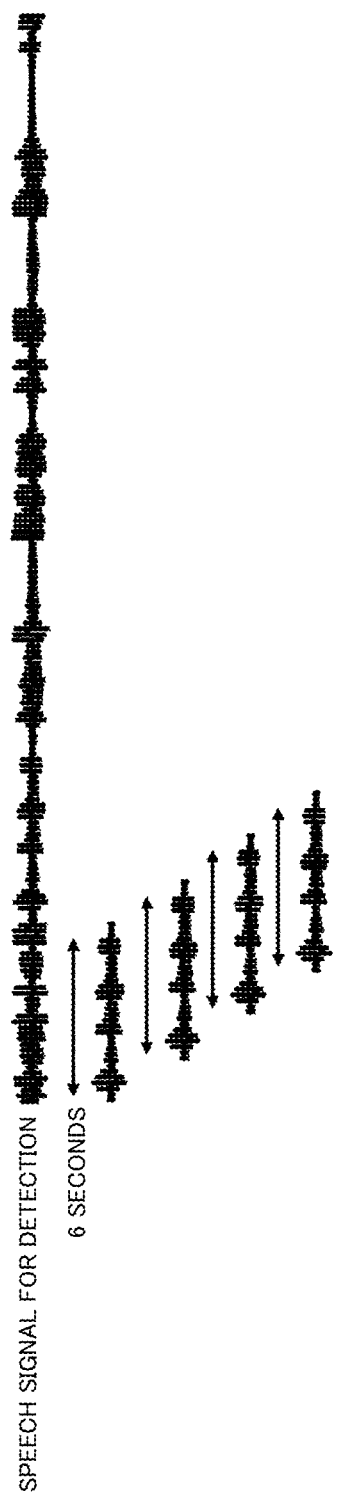
FIG. 7 is a chart for illustrating an example of how a speech segment is extracted from a speech signal for detection according to the first embodiment.

FIG. 7 is a chart for illustrating an example of how a speech segment is extracted from a speech signal for detection according to the first embodiment. In the example illustrated in FIG. 7, six-second speech signals shifted by one second is extracted as a speech segment. In FIG. 7, speech segments up to a certain position of the speech signal for detection is detected for convenience sake, while speech segments are extracted for the entire speech signal for detection.

The sponsor credit segment estimating unit 14 then subjects each speech segment extracted in step S201 to frequency-analysis (for example with a window length of 25 ms and a window shift length of 10 ms) and to mel-filter bank processing with 40 filters. In this way, the sponsor credit segment estimating unit 14 obtains a 600×40 mel-spectrogram as a feature quantity of each speech segment (S202).

The sponsor credit segment estimating unit 14 then restores (generates) the identifier learned by the processing procedure in FIG. 3 using the parameters stored in the parameter storage unit 123 (S203).

The sponsor credit segment estimating unit 14 then inputs the feature quantity obtained in step S202 to the identifier for each speech segment extracted in step S201. In this way, the sponsor credit segment estimating unit 14 determines the presence/absence of a sponsor credit in each speech segment (whether each speech segment includes a sponsor credit) (S204). For example, the sponsor credit segment estimating unit 14 determines the presence of sponsor credit "1" for an speech segment in which an output value from the identifier is equal to or greater than a prescribed threshold value, and determines the absence of a sponsor credit "0" for a speech segment in which the output value is less than the threshold value. The sponsor credit segment estimating unit 14 generates a binary time series signal indicating the presence/absence of the sponsor credit by arranging the determination results in chronological order of the speech segments.

The sponsor credit segment estimating unit 14 then detects (identifies), as a sponsor credit display segment, a segment of the binary time-series signal in which a speech segment determined to have a sponsor credit continues at least for a prescribed period (S205). Specifically, the sponsor credit segment estimating unit 14 uses a median filter to the binary time-series signal in order to remove noise. The sponsor credit segment estimating unit 14 detects (identifies), as a sponsor credit display segment, a segment of the time-series signal after the median value filtering in which a speech segment determined to have a sponsor credit display continues for at least prescribed period. Here, a segment in which a speech segment determined to have a sponsor credit display continues for at least a prescribed time period is a segment in which the signal "1" line up continuously for the prescribed period (for example, the length of the speech segment (6 seconds)×M or more (M≥2) holds). When a speech segment is produced at one-second intervals as in the embodiment (such that segments are shifted by one second), the sponsor credit segment estimating unit 14 may perform detection (identification) as follows. For example, if the signal "1" continuously line up from the 300-th to 310-th positions, the sponsor credit segment estimating unit 14 detects (identifies) the segment from 5 minutes and 0 seconds to 5 minutes and 10 seconds as the sponsor credit display segment.

The time information output unit 15 then outputs time information (starting time and ending time) about the detected sponsor credit display unit (S206).

Although the speech signal in the TV broadcast has been described by way of illustration, a sponsor credit segment may be identified in a speech signal in a radio broadcast according to the first embodiment. The first embodiment may also be applied to the case of identifying other credit segments such as a particular commercial (CM). In this case, terms included in the particular CM may be stored as relevant terms in the relevant term storage unit 122.

As described above, according to the first embodiment, credit segments can be more efficiently identified.

A second embodiment of the invention will be described. According to the second embodiment, features different from the first embodiment will be described. Features which are not particularly mentioned in the following description of the second embodiment may be identical to those of the first embodiment.

Figure 8:
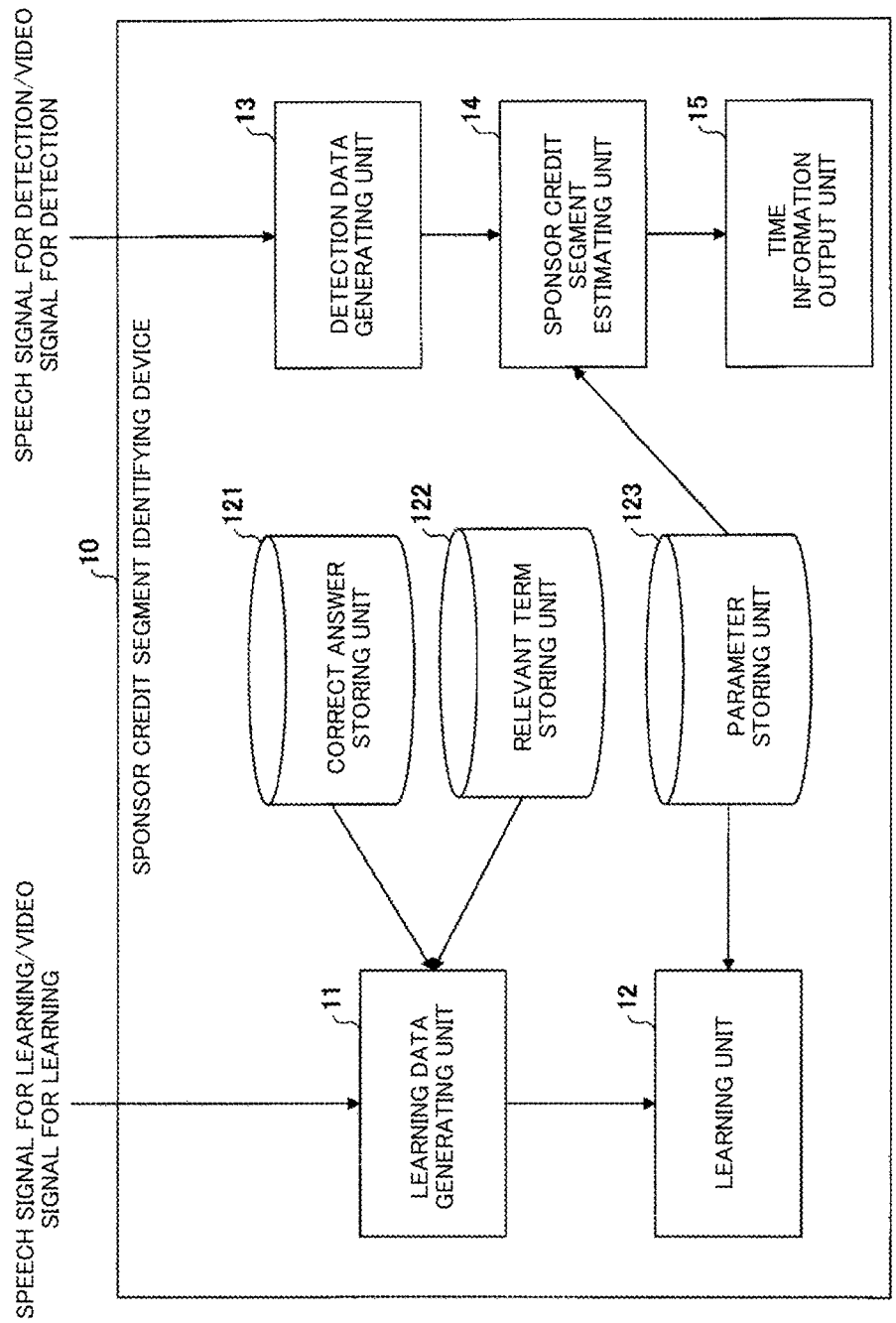
FIG. 8 is a diagram of an exemplary functional configuration of a sponsor credit segment identifying device 10 according to a second embodiment.

FIG. 8 is a diagram of an exemplary functional configuration of a sponsor credit segment identifying device 10 according to the second embodiment. In FIG. 8, portions identical or corresponding to those in FIG. 2 are designated by the same reference characters and their description will not be repeated.

The correct answer storage unit 121 stores time data (starting time and ending time) about a sponsor credit segment for a video signal in a TV broadcast for learning (i.e., a video signal corresponding to (in synchronization with) a speech signal for learning which will be hereinafter referred to as the "video signal for learning") and a speech signal (a speech signal for learning).

The parameter storage unit 123 stores parameters for an identifier which identifies the presence/absence of a sponsor credit in the pair of the video and speech signals.

Figure 9:
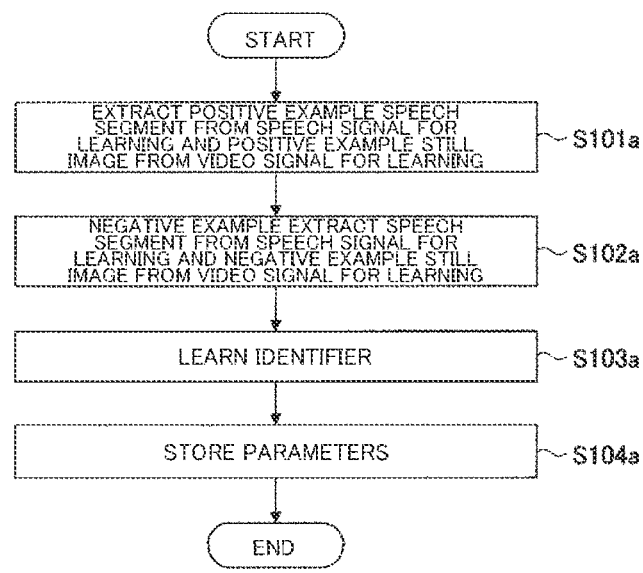
FIG. 9 is a flowchart for illustrating an exemplary processing procedure for learning processing according to the second embodiment.

FIG. 9 is a flowchart for illustrating an exemplary processing procedure for learning processing according to the second embodiment.

In step S101a, the learning data generating unit 11 extracts a positive example speech segment (the part of the speech signal for learning including a sponsor credit) from the speech signal for learning and extracts a still image corresponding to the time of the relevant term in the speech segment from the video signal for learning. Therefore, the pair of the positive example speech segment and still images is extracted. The positive example speech segment may be extracted in the same manner as that of the first embodiment. As a positive example still image, the frame (still image) corresponding to the time of the relevant term in the positive speech segment may be extracted from the video signal for learning. A plurality of frames (still images) may be extracted for one speech segment.

Figure 10:
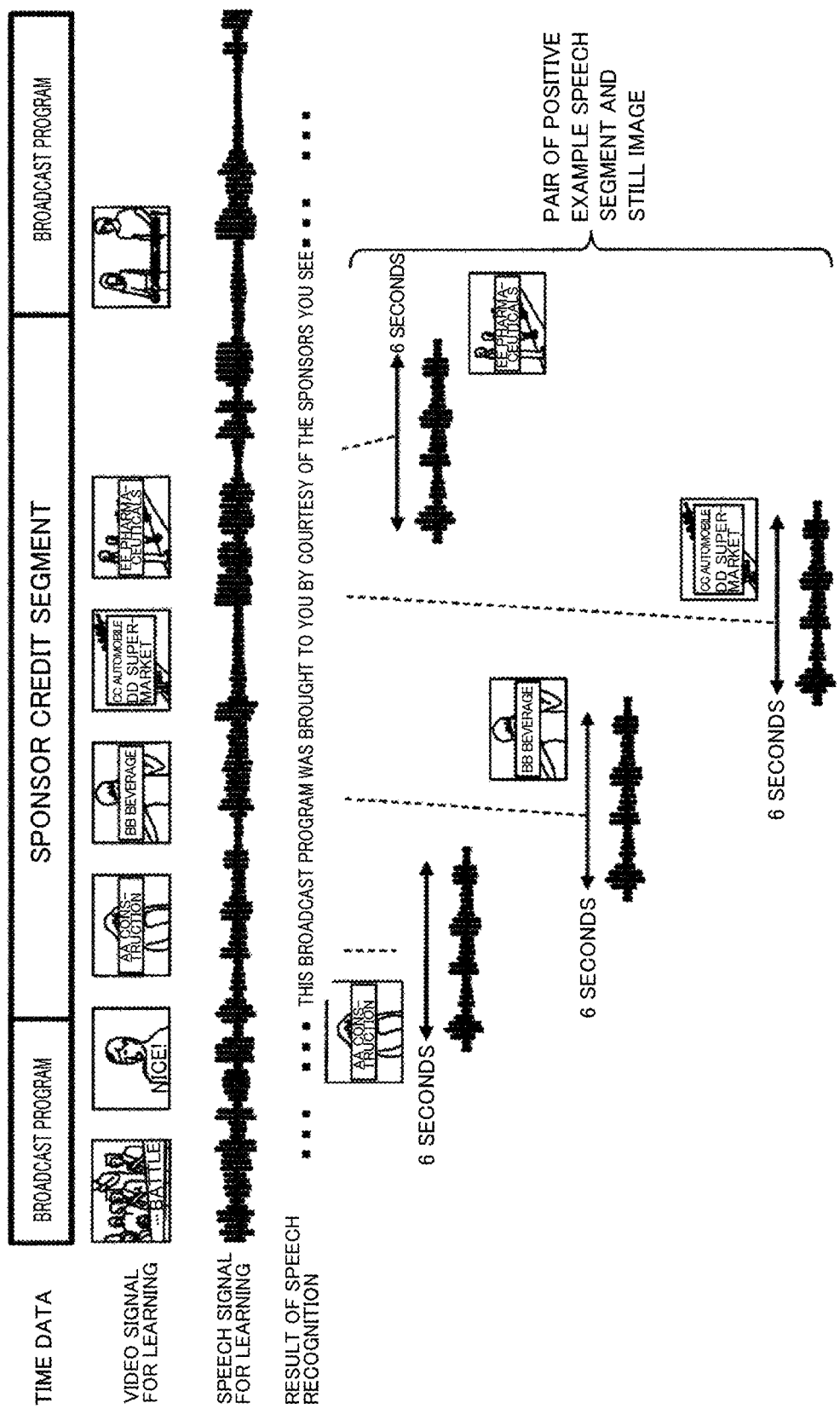
FIG. 10 is a view for illustrating how a pair of a speech segment and a still image for a positive example is extracted according to the second embodiment.

FIG. 10 is a view for illustrating how a pair of a speech segment and a still image for a positive example is extracted according to the second embodiment. The speech signal for learning in FIG. 10 is the same as the speech signal for learning in FIG. 4. Therefore, in FIG. 10, the same speech segment as that in FIG. 4 is extracted. Meanwhile, in FIG. 10, still images corresponding to the time when the relevant terms appear in speech segments are extracted from the video signal for learning. In FIG. 10, the positional relation between a speech segment and a still image is independent of the timing for the still image with respect to the speech segment.

The learning data generating unit 11 then extracts a negative example speech segment from the part of the speech signal for learning other than the sponsor credit segment and extracts a still image corresponding to the midpoint in the period of the speech segment in the video signal for learning as a negative example still image (S102a). Therefore, a pair of a speech segment and a still image for a negative example is extracted. Note that the negative example speech segment may be extracted in the same manner as that in the first embodiment.

The learning unit 12 uses the pair of the speech segment and the still image for the positive example and the pair of the speech segment and the still image for the negative example to learn an identifier related to a sponsor credit (by associating these pairs to the presence/absence of a sponsor credit) (S103a). Here, the positive example pair is extracted in step S101a, and the negative example pair is extracted in step S102a.

Specifically, the learning unit 12 obtains a 600×40 mel-spectrogram by subjecting each positive or negative speech segment to frequency analysis (for example with a window length of 25 ms and a window shift length of 10 ms) and to mel-filter bank processing with 40 filters. The learning unit 12 learns, for each speech segment, the following identifier using the mel-spectrogram obtained for the speech segment and the pair of the speech segment and the corresponding still image as input feature quantities. The following identifier is an identifier which 2-class identifies (detects) whether the pair has a sponsor credit (whether a sponsor credit is included in the pair). Examples of the identifier may include a convolution neural network or any other identifier such as an SVM may be used.

Figure 11:
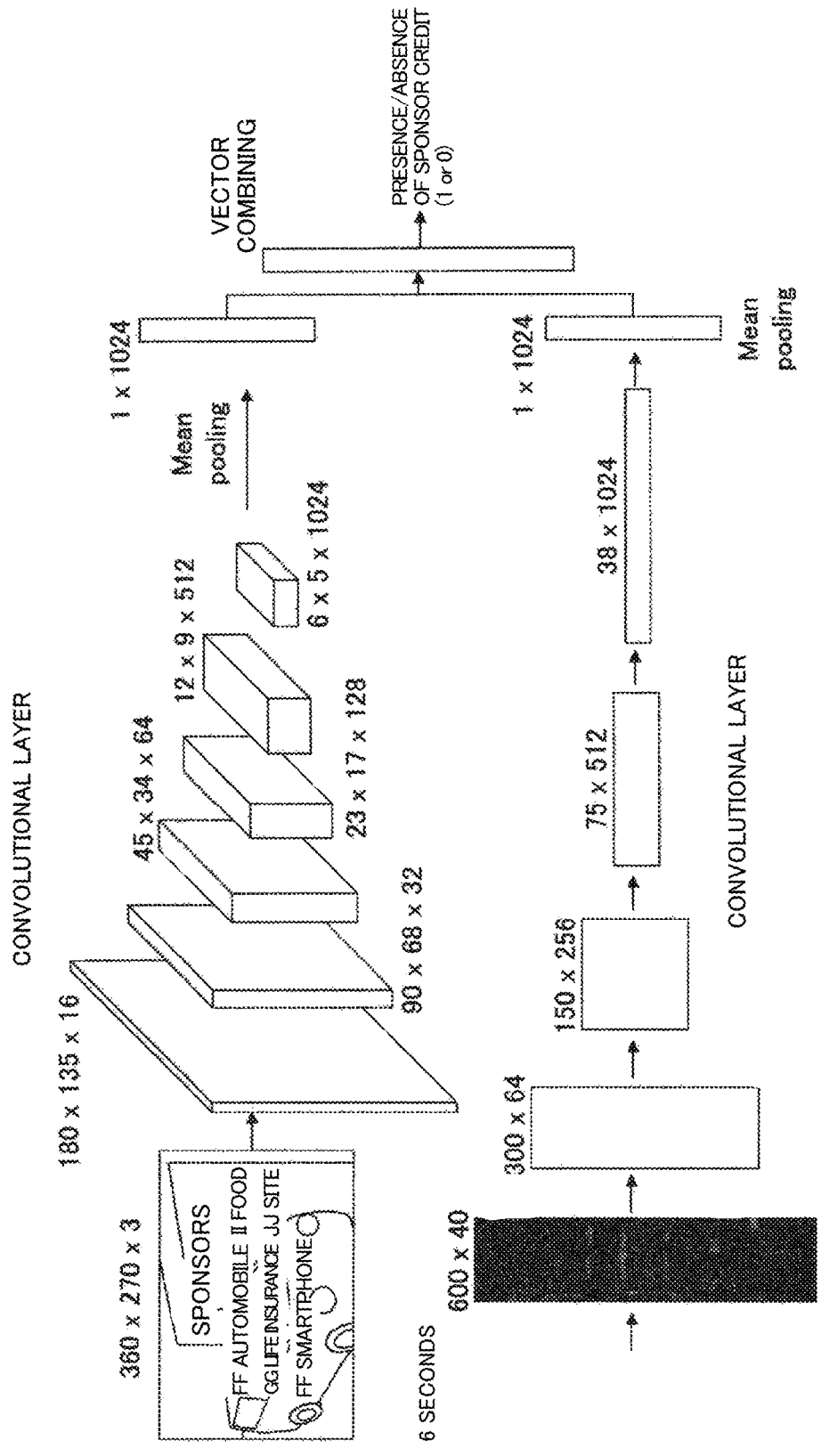
FIG. 11 is a view for illustrating a model example of an identifier according to the second embodiment.

FIG. 11 is a view for illustrating a model example of an identifier according to the second embodiment. FIG. 11 illustrates an example using a convolution neural network.

The learning unit 12 then stores parameters for the learned identifier in the parameter storage unit 123 (S104a).

Figure 12:
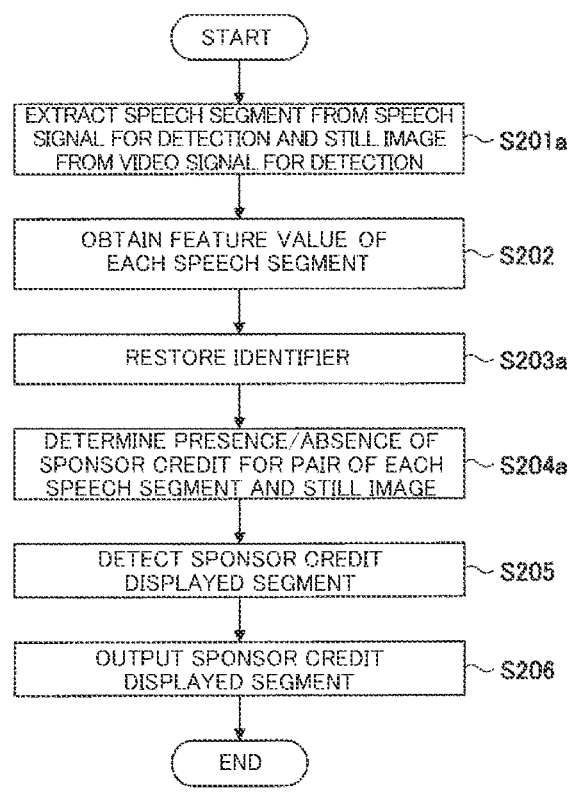
FIG. 12 is a flowchart for illustrating an exemplary processing procedure for detecting a sponsor credit according to the second embodiment.

FIG. 12 is a flowchart for illustrating an exemplary processing procedure for detecting a sponsor credit according to the second embodiment. In FIG. 12, the same steps as those in FIG. 6 are designated by the same step numbers, and their description will not be repeated. It is assumed in the processing procedure in FIG. 12 that the processing procedure in FIG. 9 has already been performed.

In step S201a, the detection data generating unit 13 extracts a speech segment from a speech signal for detection with a window length of 2N seconds and a window shift length of one second. At the same time, the detection data generating unit 13 extracts a still image at the midpoint in the period (three seconds later) of each speech segment from a video signal in a TV broadcast for detection (i.e., a video signal corresponding to (in synchronization with) the speech signal for detection).

Figure 13:
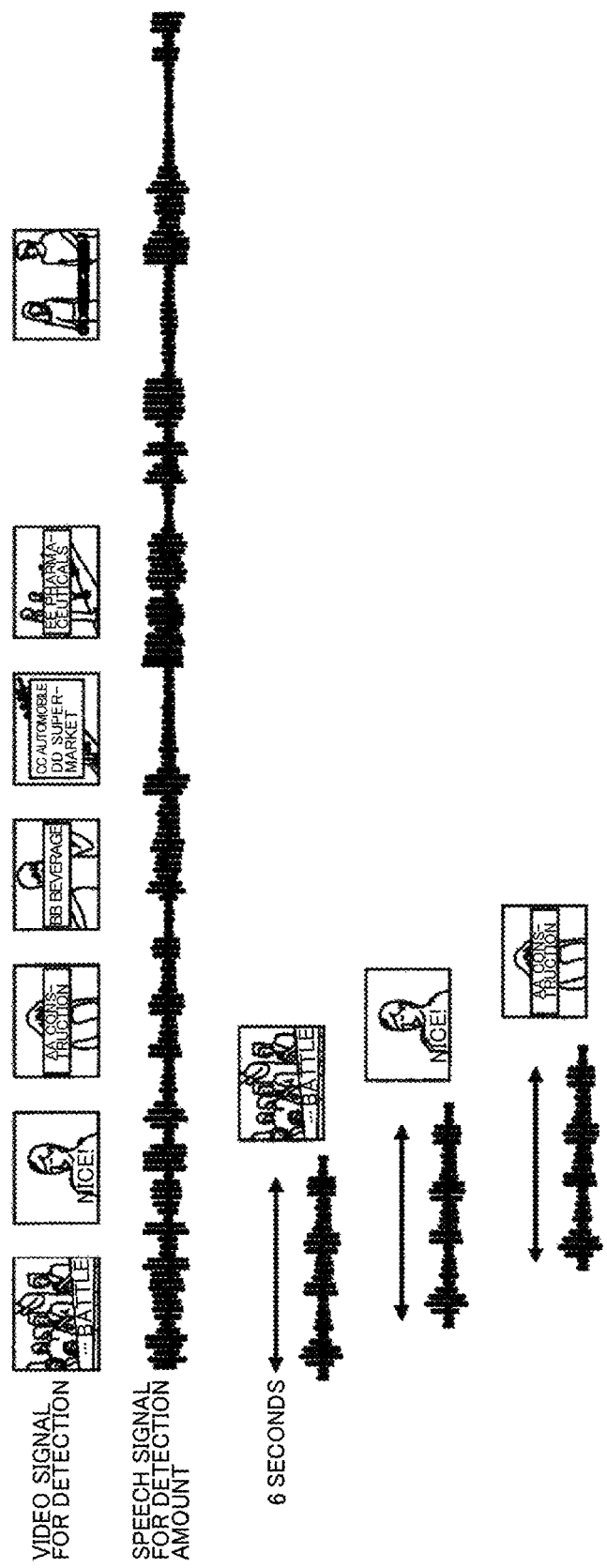
FIG. 13 is a view for illustrating an example of how a speech segment is extracted from a speech signal for detection according to the second embodiment.

FIG. 13 is a view for illustrating an example of how a speech segment and a still image are extracted from a speech signal for detection according to the second embodiment. In the example illustrated in FIG. 13, 6 second-speech signal segments shifted by one second are extracted as speech segments, and a still picture at the midpoint of the period of each of the speech segments is extracted from a video signal for detection.

Then, similarly to the first embodiment, the feature quantity (a 600×40 mel-spectrogram) of each of the speech segments is obtained (S202).

Then, the sponsor credit segment estimating unit 14 restores (generates) the identifier learned by the processing procedure in FIG. 9 using the parameters stored in the parameter storage unit 123 (S203a).

Then, the sponsor credit segment estimating unit 14 inputs, to the identifier, the pair of the feature quantity obtained in step S202 from the speech segment and the still image for each of pairs of speech segments and still images extracted in step S201a. In this way, the sponsor credit segment estimating unit 14 determines the presence/absence of a sponsor credit in each pair (S204a). The method for determining the presence/absence of the sponsor credit may be the same as that of the first embodiment. As a result, a binary time-series signal, which indicates the presence/absence of a sponsor credit in a chronological order, is generated.

The following steps (S205 and S205) may be the same as those in the first embodiment.

Figure 14:
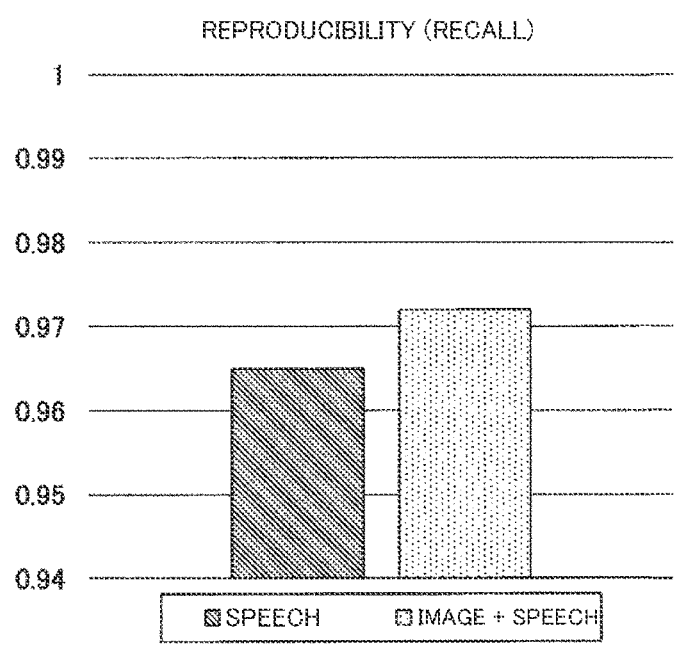
FIG. 14 is a graph for illustrating an example of evaluation results according to the embodiments.

FIG. 14 is a graph for illustrating an example of evaluation results according to the embodiments. FIG. 14 illustrates the evaluation results (recall) after learning about broadcasts from five terrestrial stations for a week and identifying sponsor credit segments in broadcasts from the five terrestrial stations for another week. Here, the recall refers the ratio of segments determined as sponsor credit segments by the sponsor credit segment identifying device 10 with respect to the correct answer segments (the segments in which sponsor credits have been actually displayed). For example, when the segment from the 11-th second position from the start of a broadcast to the 20-th second position is a correct answer segment, and the 9-second segment from the 12-th second position to the 20-th second is identified as a sponsor credit segment, the recall is 9÷10=0.9.

The "speech" on the abscissa in FIG. 14 corresponds to a case using only speech signals, in other words the first embodiment, and the "image+speech" corresponds to a case using speech signals and video signals, in other words the second embodiment.

According to FIG. 14, a high recall is obtained for both the "speech" and the "image+speech". As can be understood, a higher recall is obtained for the "image+speech" than for the "speech". Therefore, it can be understood that a sponsor credit segment can be identified with higher accuracy according to the second embodiment than the first embodiment.

Note that the embodiments described above may be applied to identifying of a sponsor credit segment in a moving image distributed for example on the Internet.

In each of the above embodiments, the sponsor credit segment identifying device 10 is an example of a credit segment identifying device. The detection data generating unit 13 is an example of an extracting unit. The sponsor credit segment estimating unit 14 is an example of an identifying unit. The speech signal for detection is an example of a first speech signal. The speech segment extracted from the speech signal for detection is an example of a first partial speech signal. The speech signal for learning is an example of a second speech signal. The speech segment extracted from the speech signal for learning is an example of a second partial speech signal. The image signal for detection is an example of a first video signal. The still image extracted from the video signal for detection is an example of the first still image. The video signal for learning is an example of a second video signal. The still image extracted from the video signal for learning is an example of a second still image.

While the embodiments of the present invention have been described in detail, the present invention is not limited by such specific embodiments, and various modifications and changes may be made within the scope of the gist of the invention as set forth in the appended claims.

REFERENCE SIGNS LIST

10 Sponsor credit segment identifying device
11 Learning data generating unit
12 Learning unit
13 Detection data generating unit
14 Sponsor credit segment estimating unit
15 Time information output unit
100 Driving device
101 Recording medium
102 Auxiliary storage device
103 Memory device
104 CPU
105 Interface device
121 Correct answer storage unit
122 Relevant term storage unit
123 Parameter storage unit
B Bus

The invention claimed is:

1. A credit segment identifying device comprising:
an extractor configured to extract a plurality of first partial speech signals from a first speech signal, the first partial speech signals each being a part of the first speech signal and shifted from each other in time direction;
an identifier configured to identify a credit segment in the first speech signal by determining whether each of the first partial speech signals includes a credit according to a first set of partial speech signal comprising a previously set term and identifying a second set of speech signals not being in the same category as the first set of partial speech signals extracted from a second speech signal; wherein
identifying the credit segment further comprising:
comparing the each of the first partial speech signals to a predetermined threshold; and
generating a binary time-series signal on the each of the first partial speech signals that exceeds the predetermined threshold;
wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

2. The credit segment identifying device according to claim 1, wherein the identifier determines whether each of the first partial speech signals includes a credit using an identifier model which has learned each of the second partial speech signals and the presence/absence of a credit.

3. The credit segment identifying device according to claim 2, wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

4. The credit segment identifying device according to claim 1, wherein whether the second partial speech signal includes the term is determined according to speech recognition carried out to the second partial speech signal as a target.

5. The credit segment identifying device according to claim 4, wherein the identifier determines whether each of the first partial speech signals includes a credit using an identifier model which has learned each of the second partial speech signals and the presence/absence of a credit.

6. The credit segment identifying device according to claim 4, wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

7. A method for identifying a credit segment, the method comprising:
extracting, by an extractor, from a first speech signal, a plurality of first partial speech signals each being a part of the first speech signal and shifted from each other in time direction;
identifying, by an identifier, a credit segment in the first speech signal by determining whether a credit is included in each of the partial speech signals according to a first set of partial speech signal comprising a previously set term and identifying a second set of speech signals not being in the same category as the first set of partial speech signals extracted from a second speech signal; wherein
identifying the credit segment further comprising:
comparing the each of the first partial speech signals to a predetermined threshold; and
generating a binary time-series signal on the each of the first partial speech signals that exceeds the predetermined threshold;
wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

8. The method according to claim 7, wherein the identifier determines whether each of the first partial speech signals includes a credit using an identifier model which has learned each of the second partial speech signals and the presence/absence of a credit.

9. The method according to claim 8, wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

10. The method according to claim 7, wherein the second partial speech signal is a speech signal including a previously set term, and whether the second partial speech signal includes the term is determined according to speech recognition carried out to the second partial speech signal as a target.

11. The method according to claim 10, wherein the identifier determines whether each of the first partial speech signals includes a credit using an identifier model which has learned each of the second partial speech signals and the presence/absence of a credit.

12. The method according to claim 10, wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

13. A computer-readable non-transitory recording medium storing a computer-executable program instructions that when executed by a processor cause a computer system to:

extract by an extractor, from a first speech signal, a plurality of first partial speech signals each being a part of the first speech signal and shifted from each other in time direction; and identify, by an identifier, a credit segment in the first speech signal by determining whether a credit is included in each of the partial speech signals according to a first set of partial speech signal comprising a previously set term and identifying a second set of speech signals not being in the same category as the first set of partial speech signals extracted from a second speech signal; wherein identifying the credit segment further comprising:
comparing the each of the first partial speech signals to a predetermined threshold; and
generating a binary time-series signal on the each of the first partial speech signals that exceeds the predetermined threshold;

wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

14. The computer-readable non-transitory recording medium of claim 13, wherein the identifier determines whether each of the first partial speech signals includes a credit using an identifier model which has learned each of the second partial speech signals and the presence/absence of a credit.

15. The computer-readable non-transitory recording medium of claim 13, wherein the second partial speech signal is a speech signal including a previously set term, and whether the second partial speech signal includes the term is determined according to speech recognition carried out to the second partial speech signal as a target.

16. The computer-readable non-transitory recording medium of claim 15, wherein the identifier determines whether each of the first partial speech signals includes a credit using an identifier model which has learned each of the second partial speech signals and the presence/absence of a credit.

17. The computer-readable non-transitory recording medium of claim 15, wherein the extractor extracts a plurality of first still images corresponding to the first partial speech signals from a first video signal corresponding to the first speech signal, and the identifier identifies a credit segment in the first speech signal and the first video signal by determining whether each pair of the first partial speech signal and the first still image includes a credit according to each of the second partial speech signals and an association between a second still image extracted from a second video signal corresponding to the second speech signal and corresponding to each of the second partial speech signals and the presence/absence of a credit.

* * * * *